US010752343B2

(12) United States Patent
Lauder (10) Patent No.: US 10,752,343 B2
(45) Date of Patent: Aug. 25, 2020

(54) ELECTRIC PROPULSION SYSTEM FOR A ROTARY WING AIRCRAFT

(71) Applicant: Sikorsky Aircraft Corporation, Stratford, CT (US)

(72) Inventor: Timothy Fred Lauder, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 409 days.

(21) Appl. No.: 15/296,625

(22) Filed: Oct. 18, 2016

(65) Prior Publication Data

US 2018/0105263 A1  Apr. 19, 2018

(51) Int. Cl.
| B64C 27/14 | (2006.01) |
| B64D 27/24 | (2006.01) |
| B64C 27/32 | (2006.01) |
| B64C 27/06 | (2006.01) |
| H02K 7/08 | (2006.01) |
| H02K 16/00 | (2006.01) |
| H02K 1/27 | (2006.01) |
| H02K 7/14 | (2006.01) |
| H02K 16/04 | (2006.01) |
| B64C 27/82 | (2006.01) |

(52) U.S. Cl.
CPC ............ *B64C 27/14* (2013.01); *B64C 27/06* (2013.01); *B64C 27/32* (2013.01); *B64D 27/24* (2013.01); *H02K 1/2793* (2013.01); *H02K 7/08* (2013.01); *H02K 7/088* (2013.01); *H02K 7/14* (2013.01); *H02K 16/00* (2013.01); *H02K 16/04* (2013.01); *B64C 27/82* (2013.01); *Y02T 50/44* (2013.01); *Y02T 50/62* (2013.01)

(58) Field of Classification Search
CPC ......... B64C 27/14; B64C 27/32; B64C 27/06; B64C 27/82; H02K 1/2793; H02K 7/088; H02K 16/04; H02K 7/14; H02K 7/08; H02K 16/00; B64D 27/24
See application file for complete search history.

(56) References Cited

U.S. PATENT DOCUMENTS

| 1,936,542 A | 11/1933 | Nardone |
| 3,362,255 A | 1/1968 | De Rocca et al. |
| 4,558,770 A | 12/1985 | Woodruff |

(Continued)

FOREIGN PATENT DOCUMENTS

| CN | 1857965 A | 11/2006 |
| CN | 101244762 A | 8/2008 |

(Continued)

OTHER PUBLICATIONS

Non-Final Office Action, U.S. Appl. No. 15/295,258; dated Oct. 17, 2016; An Electric Propulsion System for a Rotary Wing Aircraft; dated Dec. 2, 2019, pp. 1-48.

(Continued)

*Primary Examiner* — Valentina Xavier
(74) *Attorney, Agent, or Firm* — Baker Botts L.L.P.

(57) ABSTRACT

An electric propulsion system includes a mast defining an axis of rotation. At least one yoke is rotatably mounted to the mast. A fairing assembly surrounds the at least one yoke. An electric motor includes a stator assembly associated with the fairing assembly and a rotor assembly associated with the yoke.

20 Claims, 4 Drawing Sheets

(56) References Cited

U.S. PATENT DOCUMENTS

| | | |
|---|---|---|
| 4,690,390 A | 9/1987 | Kish |
| 4,729,753 A | 3/1988 | Neathery et al. |
| 4,899,957 A | 2/1990 | Eickmann |
| 4,938,333 A | 7/1990 | Kish |
| 5,188,511 A | 2/1993 | Ebert |
| 5,271,295 A | 12/1993 | Marnot |
| 5,749,449 A | 5/1998 | Kearney et al. |
| 6,484,967 B2 | 11/2002 | Protte |
| 6,823,972 B2 | 11/2004 | Gmirya |
| 7,083,142 B2 | 8/2006 | Scott |
| 7,229,251 B2 | 6/2007 | Bertolotti et al. |
| 7,621,480 B2 * | 11/2009 | Darrow, Jr. .............. B64C 1/00 244/130 |
| 8,181,902 B2 | 5/2012 | Schlunke |
| 8,235,324 B1 | 8/2012 | Birch et al. |
| 8,531,072 B2 | 9/2013 | Wishart |
| 8,628,042 B2 | 1/2014 | Imbert et al. |
| 8,844,880 B1 * | 9/2014 | Corliss .................... B64C 27/48 244/229 |
| 8,851,415 B1 | 10/2014 | Lugg |
| 8,931,732 B2 | 1/2015 | Sirohi et al. |
| 8,948,928 B2 | 2/2015 | Alber et al. |
| 9,004,395 B2 * | 4/2015 | Botti ...................... B64C 27/14 244/17.11 |
| 9,272,779 B2 | 3/2016 | Groenewald et al. |
| 9,446,842 B2 | 9/2016 | Luyks |
| 9,584,000 B2 | 2/2017 | Ruan et al. |
| 9,725,179 B2 | 8/2017 | Aubert et al. |
| 9,828,089 B2 | 11/2017 | Lauder et al. |
| 10,053,207 B2 | 8/2018 | Cox |
| 10,116,187 B1 | 10/2018 | Wishart |
| 2009/0140095 A1 | 6/2009 | Sirohi et al. |
| 2010/0209242 A1 * | 8/2010 | Popelka ................ B64C 27/001 416/1 |
| 2011/0015034 A1 | 1/2011 | Ehinger et al. |
| 2012/0074820 A1 | 3/2012 | Takeuchi |
| 2013/0126669 A1 * | 5/2013 | Hamann ................ B64C 27/12 244/60 |
| 2013/0170985 A1 | 7/2013 | Altmikus et al. |
| 2014/0302938 A1 | 10/2014 | Lidak |
| 2014/0316608 A1 | 10/2014 | Alber et al. |
| 2015/0093272 A1 | 4/2015 | Komer et al. |
| 2017/0040870 A1 | 2/2017 | Ballauf |
| 2017/0167317 A1 | 6/2017 | Lee et al. |
| 2017/0217576 A1 | 8/2017 | Lauder et al. |
| 2017/0253328 A1 | 9/2017 | Wang |
| 2017/0297689 A1 | 10/2017 | Lauder et al. |
| 2018/0002005 A1 | 1/2018 | Groenewald |
| 2018/0229835 A1 | 8/2018 | Lauder |
| 2019/0023383 A1 | 1/2019 | Lauder |
| 2019/0023384 A1 | 1/2019 | Lauder |
| 2019/0210717 A1 | 7/2019 | Lauder |

FOREIGN PATENT DOCUMENTS

| | | |
|---|---|---|
| GB | 2360752 A | 10/2001 |
| JP | 4742390 B2 | 8/2011 |
| JP | 2014149075 A | 8/2014 |
| WO | 2005100154 A1 | 10/2005 |
| WO | 2016128330 A1 | 8/2016 |

OTHER PUBLICATIONS

Notice of Allowance; U.S. Appl. No. 15/655,665, dated Jul. 20, 2017; Tilting Coaxial Rotor for a Rotary Aircraft; dated Dec. 11, 2019, pp. 1-26.

* cited by examiner

ELECTRIC PROPULSION SYSTEM FOR A ROTARY WING AIRCRAFT

BACKGROUND

The present disclosure relates to a rotary wing aircraft, and more particularly, to a rotary wing aircraft having an electric propulsion system.

Conventional rotary-wing aircraft typically utilize a mechanical drive train to transmit power from one or more engines to drive main and tail rotor systems. The helicopter mechanical drive train may include a main rotor gearbox, an intermediate gearbox, a tail rotor gearbox and their interconnecting shafts. The main rotor gearbox converts the high speed input from each engine to a low speed output for the Erwin rotor system. The main rotor gearbox may also provide power take-offs to drive an anti-torque system, a hydraulic system and other such systems. Elimination of the main gearbox and hydraulic systems may result in a significant reduction in aircraft weight and maintenance requirements.

SUMMARY

According to an embodiment, an electric propulsion system includes a mast defining an axis of rotation. At least one yoke is rotatably mounted to the mast. A fairing assembly surrounds the at least one yoke. An electric motor includes a stator assembly associated with the fairing assembly and a rotor assembly associated with the yoke.

In addition to one or more of the features described above, or as an alternative, in further embodiments comprising a bearing system disposed between the at least one yoke and the mast, wherein the bearing system allows the at least one yoke to articulate relative to the mast.

In addition to one or more of the features described above, or as an alternative, in further embodiments the fairing assembly includes a first fairing and a second fairing, the first fairing and the second fairing being positioned to define a gap there between within which the at least one yoke is rotatable.

In addition to one or more of the features described above, or as an alternative, in further embodiments the at least one yoke includes a plurality of yokes integrally formed to define a rigid disc.

In addition to one or more of the features described above, or as an alternative, in further embodiments the rotor assembly includes at least one magnet arranged circumferentially about the mast and supported by the at least one yoke.

In addition to one or more of the features described above, or as an alternative, in further embodiments the at least one magnet is mounted to a surface of the at least one yoke.

In addition to one or more of the features described above, or as an alternative, in further embodiments the at least one magnet is embedded within the at least one yoke.

The electric propulsion system according to any of the preceding claims, wherein the stator assembly includes at least one coil supported by the fairing assembly and arranged circumferentially about the mast.

In addition to one or more of the features described above, or as an alternative, in further embodiments comprising a motor support housing configured to define a relative positioning of the stator assembly and the rotor assembly.

In addition to one or more of the features described above, or as an alternative, in further embodiments the motor support housing includes a stationary portion supported by the fairing assembly and a rotating portion supported by the at least one yoke, the stationary portion and the rotating portion being operably coupled via at least one bearing.

In addition to one or more of the features described above, or as an alternative, in further embodiments comprising another electric motor contained within the fairing assembly.

In addition to one or more of the features described above, or as an alternative, in further embodiments the electric motor is arranged adjacent a first surface of the at least one yoke, and the another electric motor is defined adjacent a second surface of the at least one yoke, the second surface being opposite the first surface.

In addition to one or more of the features described above, or as an alternative, in further embodiments the fairing assembly includes an articulating mechanism such that the fairing assembly is configured to articulate relative to the mast.

In addition to one or more of the features described above, or as an alternative, in further embodiments the electric motor is housed within the fairing assembly.

According to an embodiment, a rotary wing aircraft includes an airframe, a mast engaged with the airframe and extending along a first axis, and a fairing assembly. An electric motor is housed within the fairing assembly. The electric motor includes a stator assembly coupled to the mast and a rotor assembly configured to rotate with respect to the stator assembly. A plurality of rotor blades project radially outward from the rotor assembly.

In addition to one or more of the features described above, or as an alternative, in further embodiments comprising a bearing system disposed between the rotor assembly and the mast, wherein the bearing system allows the rotor assembly to articulate relative to the mast.

In addition to one or more of the features described above, or as an alternative, in further embodiments the fairing assembly includes an articulating mechanism such that the fairing assembly is configured to articulate relative to the mast.

In addition to one or more of the features described above, or as an alternative, in further embodiments the rotor assembly includes a plurality of yokes, each of the plurality of yokes being associated with one of the plurality of rotor blades.

In addition to one or more of the features described above, or as an alternative, in further embodiments comprising a motor support housing configured to define a relative positioning of the stator assembly and the rotor assembly.

In addition to one or more of the features described above, or as an alternative, in further embodiments the motor support housing includes a stationary portion supported by the fairing assembly and a rotating portion supported by the rotor assembly, the stationary portion and the rotating portion being operably coupled via at least one bearing.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
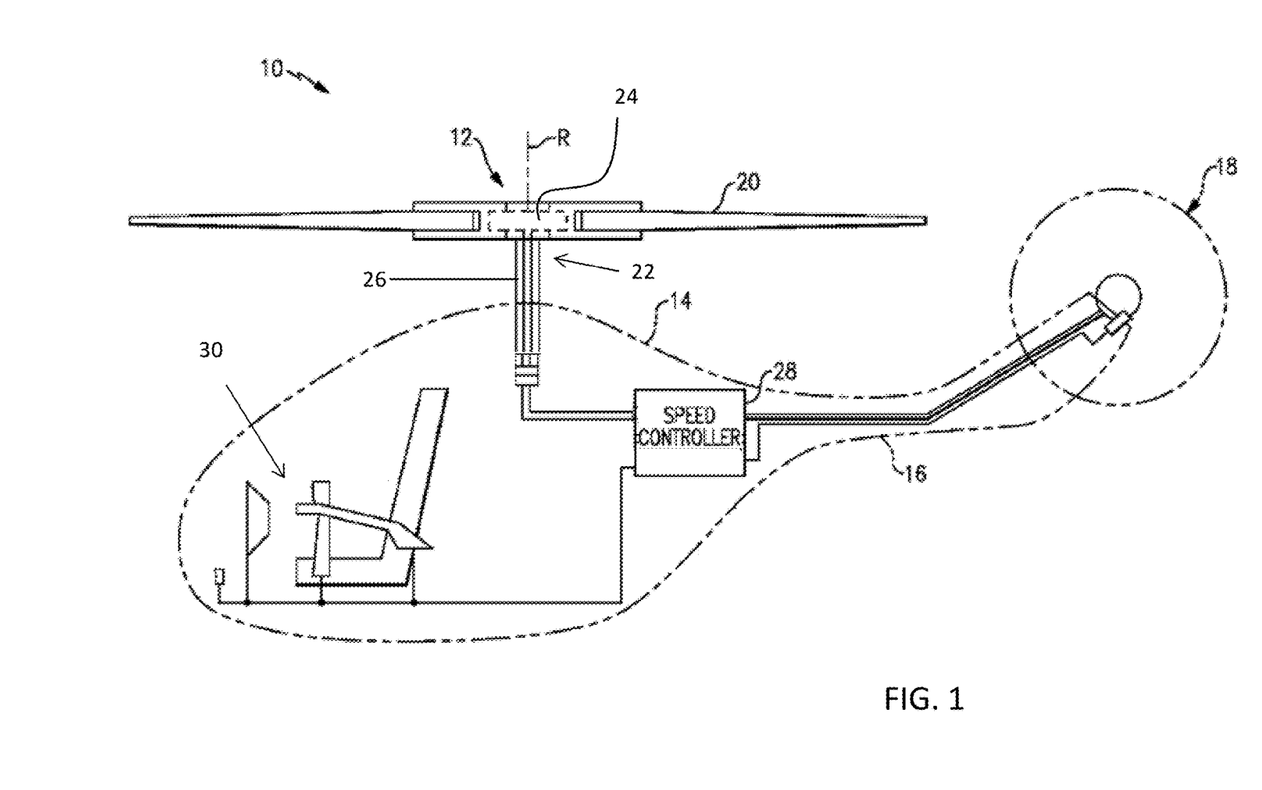
FIG. 1 is a schematic diagram of an example of a rotary wing aircraft.

FIG. 1 schematically illustrates an example of a vertical takeoff and landing (VTOL) rotary wing aircraft 10. The aircraft 10 in the non-limiting embodiment of FIG. 1 includes a main rotor system 12 supported by an airframe 14 having an extending tail 16 which mounts an anti-torque system 18, such as a tail rotor system. The main rotor system 12 includes a plurality of rotor blades 20 configured to rotate about an axis of rotation R. Although a particular helicopter configuration is schematically illustrated in the disclosed non-limiting embodiments, other configurations and/or machines, such as Unmanned Air Vehicles, high speed compound rotary wing aircraft with supplemental translational thrust systems, dual counter-rotating, coaxial rotor system aircraft, tilt-rotors and tilt-wing aircraft in either manned or unmanned configurations will also benefit here from.

At least one of the main rotor system 12 and the anti-torque system 18 is configured as an electric propulsion system 22 that generally integrates a direct drive electric motor 24 into the rotary-wing aircraft 10. In such embodiments, the propulsion system 22 includes a static mast 26 that is generally stationary relative to the airframe 14 of the aircraft 10. The electric motor 24 of the propulsion system 22 may be controlled by an electronic speed controller 28 over a wide range of speeds in response to a flight control system 30.

Figure 2:
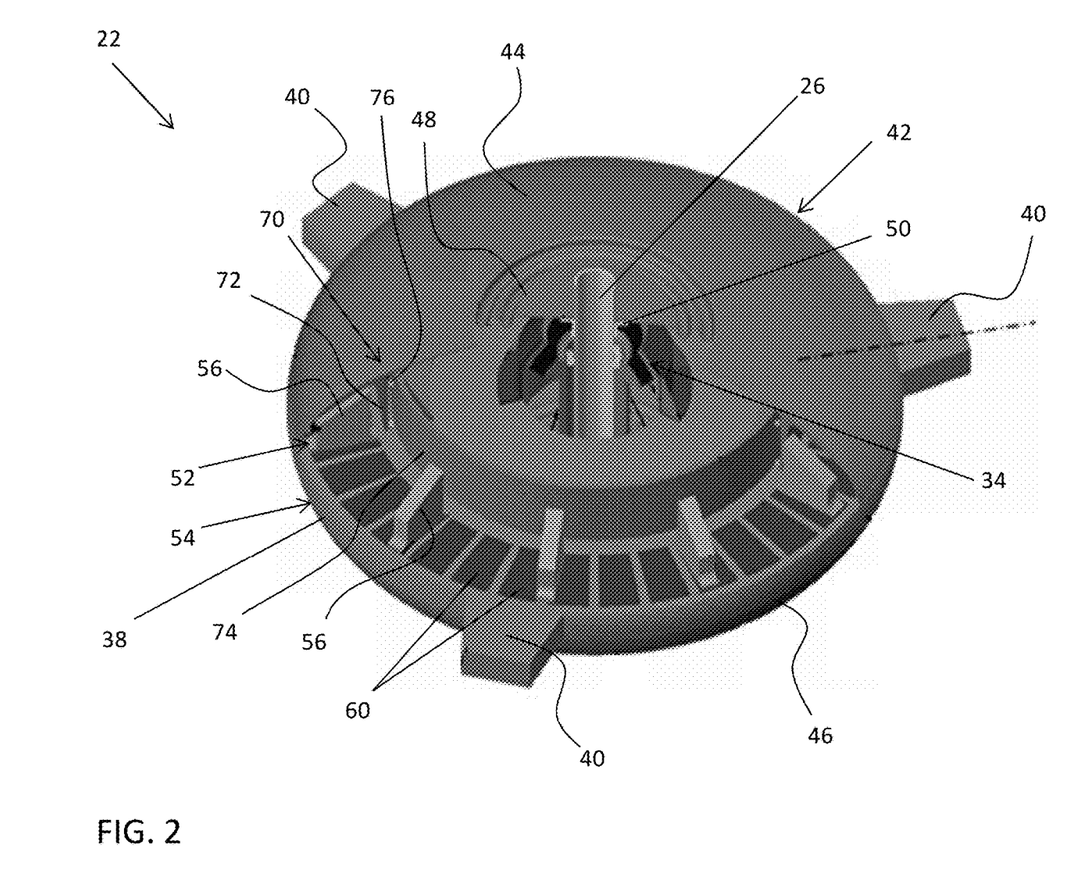
FIG. 2 is a perspective, partially cut away view of a propulsion system of a rotary wing aircraft according to an embodiment.
Figure 3:
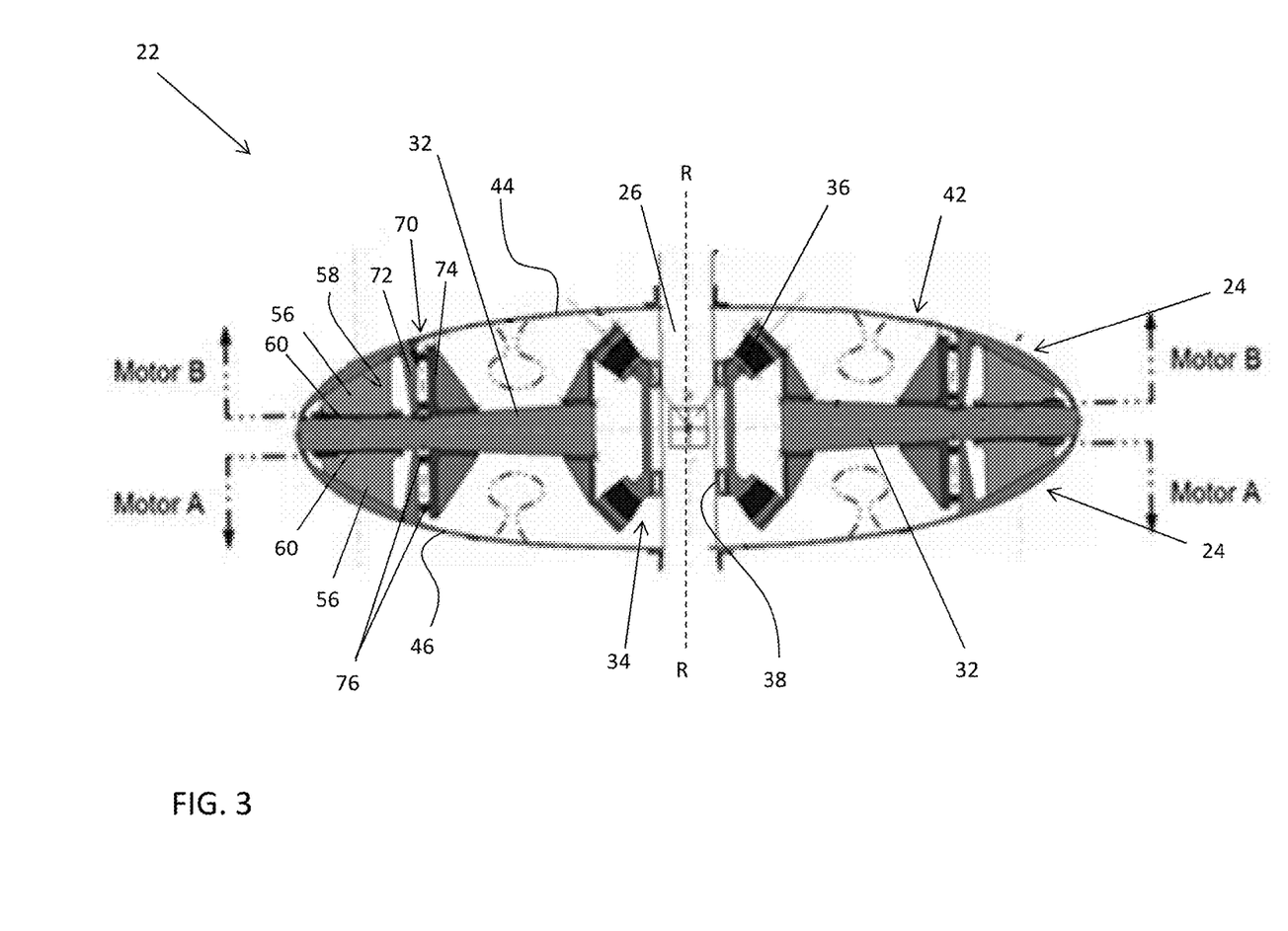
FIG. 3 is a cross-sectional view of the propulsion system of FIG. 2 according to an embodiment.

An example of a propulsion system 22 of an aircraft 10, such as a main rotor system 12 of a rotary wing aircraft 10 for example, is illustrated in more detail in FIGS. 2 and 3. The static mast 26 defines, but does not rotate about an axis of rotation R. As previously described, a plurality of outwardly extending rotor blades 20 are operably coupled thereto. In the illustrated, non-limiting embodiment, three rotor blades 20 are shown; however it should be understood that a rotor system having any number of rotor blades 20 is contemplated herein.

A yoke 32 is configured to couple an inboard end of each rotor blade 20 directly to the static mast 26 for rigid rotor systems, or indirectly to the static mast 26 for articulating rotor systems. When the propulsion system 22 is configured as an articulating rotor, a bearing system 34 is positioned between the plurality of yokes 32 and the static mast 26. In an embodiment, the bearing system 34 includes an elastomeric gimbal 36 mounted concentrically with the static mast 26. The gimbal 36 is configured to allow the yokes 32, and therefore rotor blades 20, to pivot or articulate relative to the static mast 26. The gimbal 36 provides additional degrees of freedom of movement such that the pivot axis of the yokes 32 and rotor blade 20 is no longer constrained to a configuration normal to the rotational axis R, or to an axis traversing the rotational axis R. Further, the bearing system 34 may include one or more roller bearings 38 that allow the gimbal 36, and the yoke 32 coupled thereto, to rotate freely about the static mast 26. Use of a gimbal 36 allows for a rigid in-plane design resulting in reduced flight loads, component size, and vehicle weight. In addition, the gimbal 36 reduces the maintenance and operating costs associated with the bearing system 34 by eliminating sliding contact associated with mechanical bearings.

As shown, the plurality of yokes 32 may be integrally formed as a rigid disc 38 (see FIG. 2) mounted concentrically with the static mast 26. Alternatively, embodiments where the plurality of yokes 32 associated with the plurality of rotor blades 20 are separate components spaced about the periphery of the static mast 26 are also contemplated herein. In embodiments where the yokes 32 form a disc 38, a blade cuff 40 configured to couple to a corresponding rotor blade 20 may be integrally formed with and extend generally outwardly from the outer periphery of the disc 38.

A fairing 42 generally surrounds the yoke disc 38 and the bearing system 34 to provide structural support to the propulsion system 22 and to enhance the aerodynamic properties of the propulsion system 22, such as by reducing the drag thereof. The fairing 42 may include a plurality of complementary portions, such as an upper fairing 44 and lower fairing 46. In an embodiment, the upper and lower fairings 44, 46 are substantially identical and symmetrical about the plane through the vertex of the gimbal bearing and normal to the axis of rotation R. Adjacent ends of the upper and lower fairings 44, 46 are separated from one another to define a gap within which the disc 38 and rotor blades 20 rotate relative to the static mast 26. In the illustrated, non-limiting embodiment, each portion 44, 46 of the fairing includes a diaphragm 48 configured to couple the fairing 44, 46 to the static mast 26 via an attachment mechanism 50. Inclusion of the diaphragm 48 is intended to allow articulation of the fairing 42 and the disc 38 relative to the static mast 26.

The electric motor 24 configured to drive rotation of the plurality of rotor blades 20 about the axis R includes a stator assembly 52 rigidly coupled to the static mast 26, and a rotor assembly 54 configured to rotate about the axis R. The stator assembly 52 includes at least one electromagnetic coil 56 affixed to an interior surface 58 of the fairing 42. Wiring associated with the at least one electromagnetic coil 56 may extend through a hollow interior of the static mast 26. In an embodiment, electromagnetic coils 56 may be affixed to both the upper fairing 44 and the lower fairing 46 to form a dual motor arrangement. The total number of electromagnetic coils 56 included in the motor 24 may vary based on the desired performance of the propulsion system 22. The electromagnetic coils 56 are spaced circumferentially about the static mast 26 and are generally located at a position spaced radially outward from the static mast 26, such as adjacent to the outer periphery of the fairing 44, 46. In embodiments of the propulsion system 22 having a dual motor arrangement, one or more of the electromagnetic coils 56 mounted to the upper fairing 44 may be vertically aligned with one or more electromagnetic coils 56 mounted to the lower fairing 46. Alternatively, or in addition, the one or more of the electromagnetic coils 56 mounted to the upper fairing 44 may be staggered relative to the electromagnetic coils 56 mounted to the lower fairing 46.

The rotor assembly 54 of the motor 24 includes one or more permanent magnets 60 mounted to the rotatable disc 38 or yokes 32. As shown, the magnets 60 are mounted to the disc 38 horizontally and are positioned adjacent an outer periphery of the disc 38 such that the one or more magnets 60 are vertically aligned with the at least one electromagnetic coil 56. In an embodiment, the magnets 60 are fixedly or removably mounted to at least one of an upper surface and a lower surface of the disc 38. In another embodiment, the magnets 60 are partially or fully embedded within the disc, 38, such as within one or more complementary openings (not shown) formed therein. The magnets 60 are generally circumferentially positioned about the disc 38, concentric with the static mast 26. The magnets 60 may, but need not be, equidistantly spaced about the disc 38. The rotor assembly 54 is configured to rotate with respect to the stator assembly 52 and the static mast 26 as the magnets 60 of the rotor assembly 54 react with an induced magnetic field generated when the electromagnetic coils 56 of the stator assembly 52 are energized.

The spatial positioning between the electromagnetic coils 56 of the stator assembly 52 and the adjacent permanent magnets 60 of the rotor assembly 54 is defined by a motor support housing 70. In the illustrated non-limiting embodiment, the motor support housing 70 includes a stationary portion 72 coupled to a fairing 44, 46 having one or more electromagnetic coils 56 mounted thereto, and a rotating portion 74 coupled to an adjacent surface of the yoke disc 38 facing the fairing 44, 46 and electromagnetic coils 56. At least one bearing 76 is arranged at the interface between the stationary and rotating portions 72, 74 of the motor support housing 70. As a result, the motor support housing 70 functions as a de-rotation unit. A liner of the rotating portion 74 of the motor support housing 70 is configured to engage the at least one bearing 76 and may be formed from any suitable material, such as a metal or composite material for example.

Figure 4:
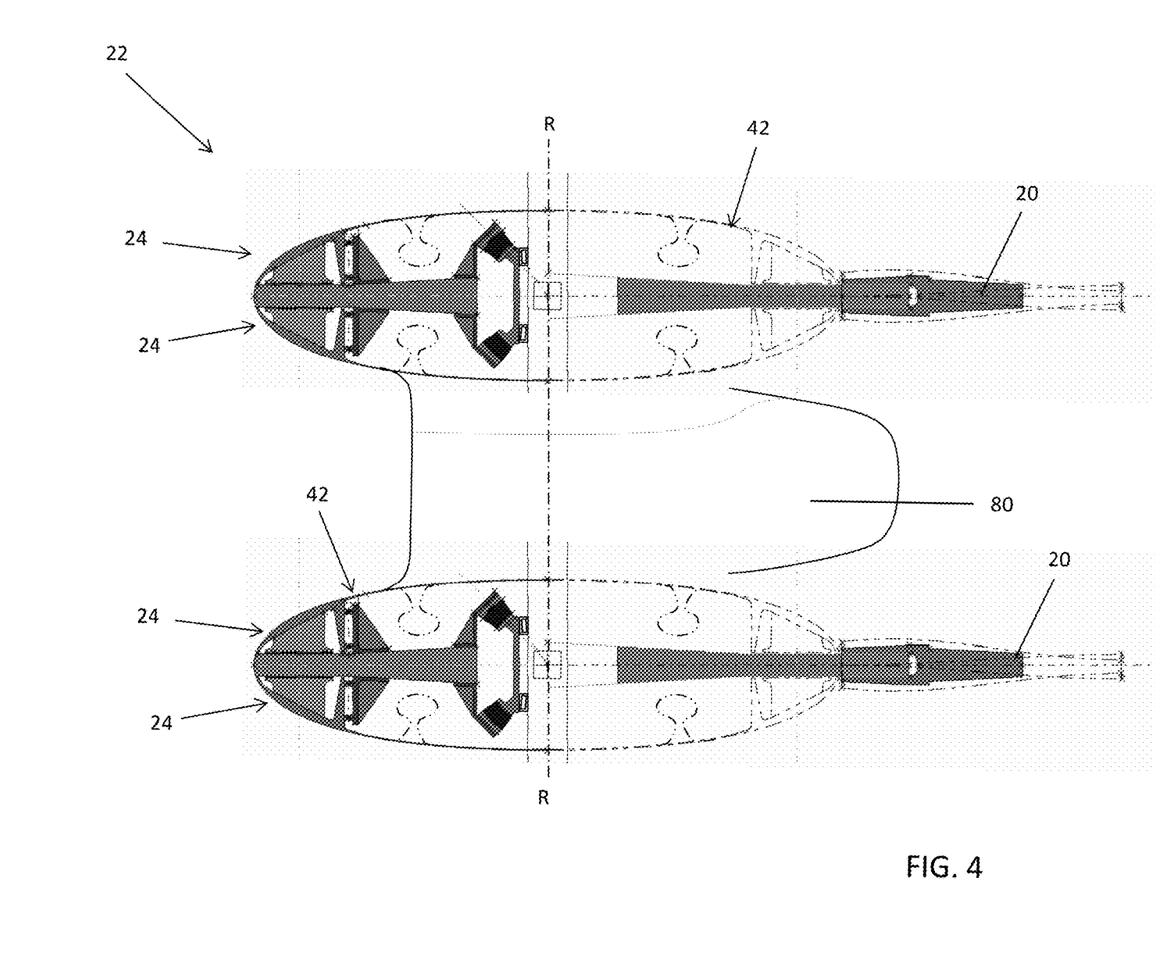
FIG. 4 is a side view of a propulsion system of a rotary wing aircraft according to an embodiment.

The propulsion system 22 including at least one electric motor 24 contained within the surrounding fairing may be implemented as both a main rotor system and an anti-torque or auxiliary propulsion system. With reference to FIG. 4, the propulsion system 22 may be applied to a dual, contra-rotating, coaxial rotor system as shown. In such embodiments, both rotor systems will rotate about the same static mast 26; however rotation of each rotor system will be driven independently, by at least one electric motor 24 formed within a corresponding fairing 42. A sail fairing 80 is typically positioned between the rotor fairings of a dual rotor system. Because the adjacent rotor fairings 42 are stationary, the sail fairing 80 may be mounted directly to the static mast 26. As a result, the installation of the sail fairing 80 is simplified by eliminating the complex bearing system previously used to allow rotation of the rotor fairings 42 while maintaining the sail fairing 80 aligned with the relative wind in forward flight.

Benefits of the present disclosure may include but are not limited to a reduction in weight, fewer parts and lower costs relative to more traditional aircrafts. The present disclosure eliminates more traditional motor housing and mounting structures and replaces the rotating shaft with a structurally efficient static mast. Moreover, traditional gearboxes are eliminated.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An electric propulsion system comprising:
   a mast defining an axis of rotation;
   at least one yoke rotatably mounted to the mast;
   a fairing assembly surrounding the at least one yoke; and
   an electric motor including a stator assembly associated with the fairing assembly and a rotor assembly associated with the yoke.

2. The electric propulsion system according to claim 1, further comprising a bearing system disposed between the at least one yoke and the mast, wherein the bearing system allows the at least one yoke to articulate relative to the mast.

3. The electric propulsion system according to claim 1, wherein the fairing assembly includes a first fairing and a second fairing, the first fairing and the second fairing being positioned to define a gap there between within which the at least one yoke is rotatable.

4. The electric propulsion system according to claim 1, wherein the at least one yoke includes a plurality of yokes integrally formed to define a rigid disc.

5. The electric propulsion system according to claim 1, wherein the rotor assembly includes at least one magnet arranged circumferentially about the mast and supported by the at least one yoke.

6. The electric propulsion system according to claim 5, wherein the at least one magnet is mounted to a surface of the at least one yoke.

7. The electric propulsion system according to claim 5, wherein the at least one magnet is embedded within the at least one yoke.

8. The electric propulsion system according to claim 1, wherein the stator assembly includes at least one coil supported by the fairing assembly and arranged circumferentially about the mast.

9. The electric propulsion system according to claim 1, further comprising a motor support housing configured to define a relative positioning of the stator assembly and the rotor assembly.

10. The electric propulsion system according to claim 9, wherein the motor support housing includes a stationary portion supported by the fairing assembly and a rotating portion supported by the at least one yoke, the stationary portion and the rotating portion being operably coupled via at least one bearing.

11. The electric propulsion system according to claim 1, further comprising another electric motor contained within the fairing assembly.

12. The electric propulsion system according to claim 11, wherein the electric motor is arranged adjacent a first surface of the at least one yoke, and the another electric motor is defined adjacent a second surface of the at least one yoke, the second surface being opposite the first surface.

13. The electric propulsion system according to claim 1, wherein the fairing assembly includes an articulating mechanism such that the fairing assembly is configured to articulate relative to the mast.

14. The electric propulsion system according to claim 1, wherein the electric motor is housed within the fairing assembly.

15. A rotary wing aircraft comprising:
   an airframe;
   a mast engaged to the airframe and extending along a first axis;
   a fairing assembly;

an electric motor housed within the fairing assembly, the electric motor including a stator assembly coupled to the mast and a rotor assembly configured to rotate with respect to the stator assembly; and a plurality of rotor blades projecting radially outward from the rotor assembly.

16. The rotary wing aircraft according to claim 15, further comprising a bearing system disposed between the rotor assembly and the mast, wherein the bearing system allows the rotor assembly to articulate relative to the mast.

17. The rotary wing aircraft according to claim 15, wherein the fairing assembly includes an articulating mechanism such that the fairing assembly is configured to articulate relative to the mast.

18. The rotary wing aircraft according to claim 15, wherein the rotor assembly includes a plurality of yokes, each of the plurality of yokes being associated with one of the plurality of rotor blades.

19. The rotary wing aircraft according to claim 15, further comprising a motor support housing configured to define a relative positioning of the stator assembly and the rotor assembly.

20. The rotary wing aircraft according to claim 19, wherein the motor support housing includes a stationary portion supported by the fairing assembly and a rotating portion supported by the rotor assembly, the stationary portion and the rotating portion being operably coupled via at least one bearing.

* * * * *

UNITED STATES PATENT AND TRADEMARK OFFICE
CERTIFICATE OF CORRECTION

PATENT NO. : 10,752,343 B2
APPLICATION NO. : 15/296625
DATED : August 25, 2020
INVENTOR(S) : Timothy Fred Lauder It is certified that error appears in the above-identified patent and that said Letters Patent is hereby corrected as shown below:

In the Claims

In Column 6, Line 6, Claim 1 please delete, "a mast defining..." and please insert, -- a stationary mast defining --, therefor.

In Column 6, Line 7, Claim 1 after "to the mast," please delete, ";" and please insert, -- for supporting a rotor blade; --, therefor.

In Column 6, Line 65, Claim 6 please delete, "a mast engaged..." and please insert, -- a stationary mast engaged --, therefor.

Signed and Sealed this
Third Day of September, 2024

Katherine Kelly Vidal
Director of the United States Patent and Trademark Office